(12) United States Patent
Kim et al.

(10) Patent No.: US 7,808,531 B2
(45) Date of Patent: Oct. 5, 2010

(54) METHOD AND APPARATUS FOR AUTO WHITE CONTROLLING

(75) Inventors: Sung-su Kim, Yongin-si (KR);
Ho-young Lee, Suwon-si (KR);
Hyun-hwa Oh, Yongin-si (KR);
Seong-deok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 984 days.

(21) Appl. No.: 11/594,217

(22) Filed: Nov. 8, 2006

(65) Prior Publication Data
US 2007/0146498 A1 Jun. 28, 2007

(30) Foreign Application Priority Data
Dec. 14, 2005 (KR) ........................ 10-2005-0123514
May 9, 2006 (KR) ........................ 10-2006-0041702

(51) Int. Cl.
*H04N 9/73* (2006.01)
*H04N 7/68* (2006.01)
*H04N 9/77* (2006.01)
*G06K 9/00* (2006.01)

(52) U.S. Cl. ............... 348/223.1; 348/225.1; 348/234; 348/655; 348/663; 382/162

(58) Field of Classification Search ........... 348/223.1, 348/182, 234, 236, 238, 396, 362, 224.1, 348/225.1, 649, 650, 651, 652, 396.1, 655, 348/E9.042, E9.036, 713, 663, 645, 644, 348/453, 450, 444, 441; 382/162, 167
See application file for complete search history.

(56) References Cited

U.S. PATENT DOCUMENTS 5,659,357 A * 8/1997 Miyano .................... 348/223.1

(Continued)

FOREIGN PATENT DOCUMENTS

JP 6-323908 A 11/1994

(Continued)

OTHER PUBLICATIONS

D. Qian et al , "An automatic light spectrum compensation method for CCD white balance measurement", IEEE Transactions on Consumer Electronics, vol. 43, No. 2, pp. 216220 (1997).*

(Continued)

*Primary Examiner*—Tuan Ho
*Assistant Examiner*—Marly Camargo
(74) *Attorney, Agent, or Firm*—Sughrue Mion, PLLC

(57) ABSTRACT

An auto white controlling method and apparatus are provided. The method includes providing a plurality of feature points having color features of an image if the image includes an object having dominant chroma; detecting a first illuminant according to the feature points; calculating a mean chroma of data showing a chroma difference within a threshold value with a chroma of the first illuminant among data constituting the image; and providing a second illuminant by mapping the mean chroma to an illuminant locus. The apparatus includes a feature-analyzing module that provides a plurality of feature points having color features of an image; and an illuminant-detecting module that detects a first illuminant by using the feature points, calculates a mean chroma of data showing the color difference within a threshold value with the chroma of the first illuminant, and provides a second illuminant by mapping the mean chroma to an illuminant locus.

24 Claims, 12 Drawing Sheets

U.S. PATENT DOCUMENTS

| | | | |
|---|---|---|---|
| 6,639,628 B1 * | 10/2003 | Lee et al. | 348/223.1 |
| 6,791,606 B1 * | 9/2004 | Miyano | 348/223.1 |
| 6,952,225 B1 * | 10/2005 | Hyodo et al. | 348/223.1 |
| 6,965,401 B1 * | 11/2005 | Takei | 348/225.1 |
| 7,158,174 B2 * | 1/2007 | Gindele et al. | 348/224.1 |
| 7,218,344 B2 * | 5/2007 | Cooper | 348/223.1 |
| 7,356,180 B2 * | 4/2008 | Speigle et al. | 382/167 |
| 7,643,068 B2 * | 1/2010 | Hyodo | 348/223.1 |
| 2003/0052978 A1 * | 3/2003 | Kehtarnavaz et al. | 348/223.1 |
| 2004/0095478 A1 * | 5/2004 | Takano et al. | 348/223.1 |
| 2005/0122408 A1 * | 6/2005 | Park et al. | 348/223.1 |
| 2005/0286097 A1 * | 12/2005 | Hung et al. | 358/509 |
| 2008/0266417 A1 * | 10/2008 | Abe | 348/223.1 |
| 2008/0297620 A1 * | 12/2008 | Goel | 348/223.1 |

FOREIGN PATENT DOCUMENTS

| | | |
|---|---|---|
| JP | 2000-092509 A | 3/2000 |
| JP | 2003-259389 A | 9/2003 |
| KR | 10-2001-0076835 A | 8/2001 |

OTHER PUBLICATIONS

D. H. Marimont et al., "Linear models of surface and illuminant spectra", J. Opt. Soc. Am. A, vol. 9, No. 11, pp. 1905-1913 (1992).*
M. abe et al., "A method to estimate correlated color temperatures of illuminants using a color video camera", IEEE Transactions on Instrumentation and Measurement, vol. 40, No. 1, pp. 28-33 (1991).*

* cited by examiner

REFERENCE REGION

SUB-REGION ly, because the human visual system automatically controls sensitivity to color, differences in color temperature in human perception is insignificant. However, because an image-capturing device such as a camera or a camcorder captures the color temperature as is, if an illuminant changes, images captured by the image-capturing device show different colors.

METHOD AND APPARATUS FOR AUTO WHITE CONTROLLING

CROSS-REFERENCE TO RELATED APPLICATION

This application claims priority from Korean Patent Application Nos. 10-2005-0123514 and 10-2006-0041702, filed on Dec. 14, 2005 and May 9, 2006, respectively, the whole disclosures of which are hereby incorporated herein by reference.

BACKGROUND OF THE INVENTION

1. Field of the Invention

Methods and apparatuses consistent with the present invention relate to auto white controlling, and more particularly, to providing consistent color reproduction performance even when an object having a dominant chroma exists in an image.

2. Description of the Related Art

Light has a unique color, called color temperature, and Kelvin (K) is used as the unit of the color temperature. Generally, because the human visual system automatically controls sensitivity to color, differences in color temperature in human perception is insignificant. However, because an image-capturing device such as a camera or a camcorder captures the color temperature as is, if an illuminant changes, images captured by the image-capturing device show different colors.

For example, because the color temperature of the sun on a fine day is high, captured images show a blue color tone, whereas because the color temperature of the sun at sunset is low, captured images show a red color tone. A related art auto-white controlling technology compensates for distortion of the color tone of images if captured images are biased in at least one direction among red (R), green (G) and blue (B) elements, depending on the color temperature.

However, in the case of the related art auto-white controlling technology, if an object having dominant chroma exists in an image, the color reproduction is not consistent even under the same illuminant.

SUMMARY OF THE INVENTION

An aspect of the present invention provides a method and apparatus for auto white controlling, which provides consistent color reproduction even when an object having dominant chroma exists in an image.

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an exemplary embodiment of the present invention, there is provided an auto white controlling method, including providing a plurality of feature points having color features of an image if the image includes an object having dominant chroma; detecting a first illuminant according to the plurality of feature points; calculating a mean chroma of data showing a chroma difference within a threshold value with a chroma of the first illuminant among data constituting the image; and providing a second illuminant by mapping the mean chroma to an illuminant locus.

According to an exemplary embodiment of the present invention, there is provided an auto white controlling apparatus, including a feature-analyzing module that provides a plurality of feature points having color features of an image if the image includes an object having dominant chroma; and an illuminant-detecting module that detects a first illuminant by using the plurality of feature points, calculates a mean chroma of data showing the color difference within a threshold value with the chroma of the first illuminant among data comprising the image, and provides a second illuminant by mapping the mean chroma to an illuminant locus.

BRIEF DESCRIPTION OF THE DRAWINGS

The above and other aspects of the present invention will become apparent by describing in detail certain exemplary embodiments thereof with reference to the attached drawings in which.

DETAILED DESCRIPTION OF THE INVENTION

Figure 1:
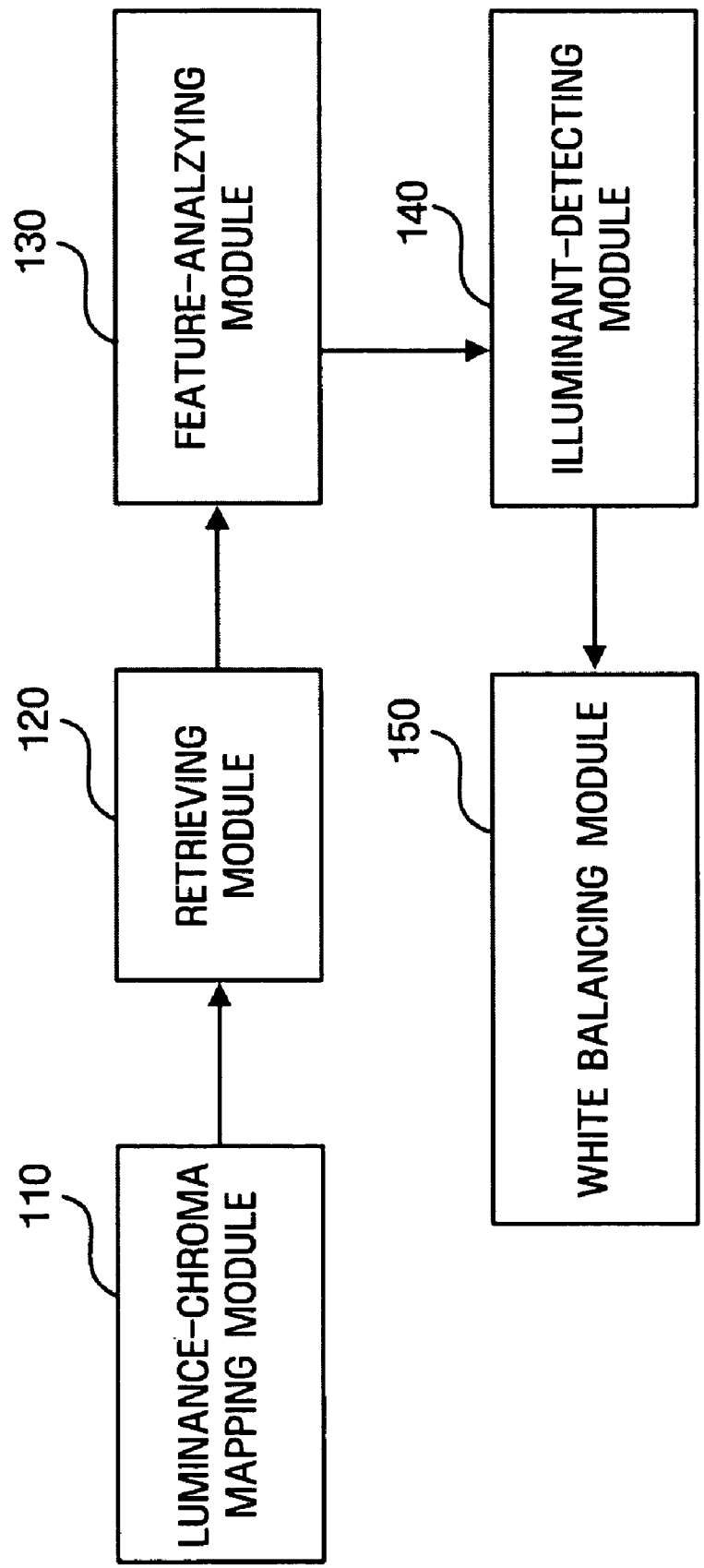
FIG. 1 is a block diagram illustrating an auto white controlling apparatus according to an exemplary embodiment of the present invention.

Exemplary embodiments of the present invention will now be described in detail with reference to the accompanying drawings.

Advantages and features of the present invention and methods of accomplishing the same may be understood more readily by reference to the following detailed description of exemplary embodiments and the accompanying drawings. The present inventive concept may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present inventive concept will only be defined by the appended claims. Like reference numerals refer to like elements throughout the specification.

FIG. 1 is a block diagram illustrating an auto white controlling apparatus according to an exemplary embodiment of the present invention.

The illustrated auto white controlling apparatus includes a luminance-chroma-mapping module 110, a retrieving module 120, a feature-analyzing module 130, an illuminant-detecting module 140, and a white balancing module 150.

The luminance-chroma-mapping module 110 converts data of an inputted image into YCrCb data.

Figure 2:
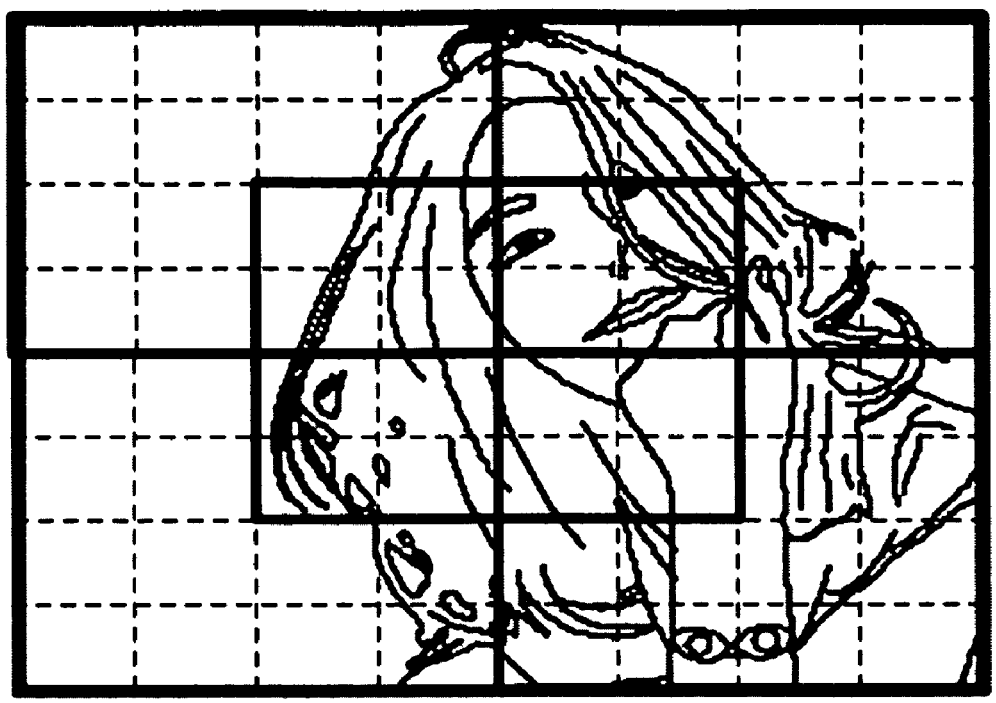
FIG. 2 illustrates a state where an image according to the exemplary embodiment of the present invention is divided into a reference region and a sub region.
Figure 2:
Figure 2:
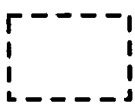

The retrieving module 120 retrieves an object having dominant chroma (hereinafter, referred to as a dominant object) within the image by analyzing the inputted image. The retrieving module can divide the inputted image into a plurality of reference regions as illustrated in FIG. 2, and divide each reference region into a plurality of sub-regions. It is possible that the reference region is generally set in advance as a region having a high possibility of having a dominant object. The retrieving module 120 calculates the mean chroma (hereinafter, referred to as the mean chroma of the reference region) of data (or pixels) comprising the reference region and the mean chroma (hereinafter, referred to as the mean chroma of the sub-region) of data (or pixels) comprising a sub-region by sub-regions included in the reference region. After the calculation, the retrieving module 120 calculates a difference between the mean chroma of the reference region and mean chromas of sub-regions included in the reference region. If one or more sub-regions, in which the difference between the mean chroma of the sub-region and the mean chroma of the reference region is less than a threshold value, occupy more than a threshold amount among a plurality of sub-regions, the retrieving module 120 can determine that a dominant object exists in the reference region. It is possible that the threshold value is set in advance as an appropriate numerical value determined by experiment in determining whether there is the dominant object.

The feature-analyzing module 130 provides a plurality of feature points having a color feature of an inputted image. The plurality of feature points include data having a maximum luminance value (hereinafter, referred to as the maximum luminance point) and data having a minimum luminance value (hereinafter, referred to as the minimum luminance point) among data comprising an inputted image, a reference point having the mean luminance and the mean chroma of data comprising the dominant object in the inputted image, and a first clustering point and a second clustering point having the mean luminance and the mean chroma of data included in two groups comprised by remaining data except data of the dominant data among data comprising the inputted image.

The feature points can be provided when the retrieving module 120 detects the dominant object from the inputted image, and the process where the feature-analyzing module 130 provides feature points will be explained later with reference to FIG. 3.

The illuminant-detecting module 140 detects a first illuminant by using feature points provided by the feature-analyzing module 130. The first illuminant is a temporary illuminant used to detect the final illuminant from the inputted image. The illuminant-detecting module 140 retrieves data having a chroma difference below a threshold value with the chroma of the first illuminant among data comprising the inputted image, and calculates the mean chroma of the retrieved data. The threshold value indicates a boundary of data that can express illuminants well according to the change of the environment, and it is possible that the value is set in advance as an appropriate value. After the calculation, the illuminant-detecting module 140 maps a gray point having the calculated mean chroma to a illuminant locus, and detects the final illuminant. The illuminant locus may be predetermined. The process where the illuminant-detecting module 140 detects the final illuminant will be explained later by referring to FIG. 4.

The white balancing module 150 executes white-balancing on an inputted image by using the final illuminant.

The term "module" in the description of FIG. 1 refers to a software or a hardware element like a Field Programmable Gate Array (FPGA) or an Application Specific Integrated Circuit (ASIC), and "module" executes certain roles. But "module" is not limited to software or hardware. "Module" can be construed to exist in addressable storage media, or can be construed to regenerate one or more processors. For example, "module" can include software elements, object-oriented software elements, class elements, task elements, processes, functions, attributes, procedures, sub-routines, segments of program code, drivers, firmware, microcodes, circuits, data, database, data structures, tables, arrays, and variables. Elements and functions provided in the modules can be combined into fewer elements or modules, or can be divided into additional elements and modules.

Hereinafter, the auto white controlling method according to an exemplary embodiment of the present invention will be described with reference to FIGS. 3 to 8G.

Figure 3:
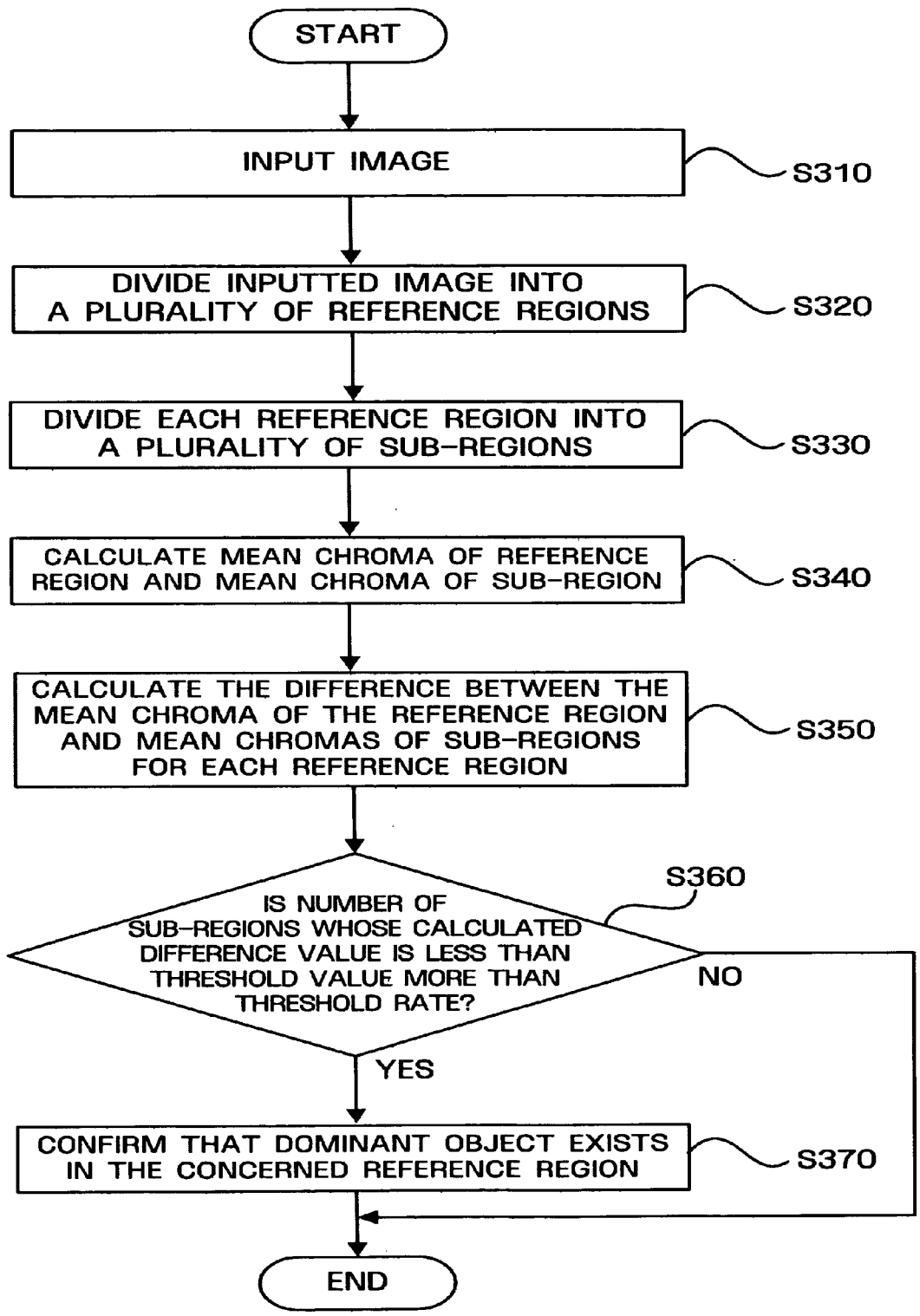
FIG. 3 is a flow chart illustrating a process of retrieving a dominant object in an inputted image.

FIG. 3 is a flow chart illustrating a process of retrieving a dominant object in an inputted image. The process of FIG. 3 is executed by the retrieving module 120 of the auto white controlling apparatus described above in reference to FIG. 1.

An image converted into YCrCb data is inputted by the luminance-chroma-mapping module 110 (operation S310). The retrieving module 120 divides the inputted image into a plurality of reference regions (operation S320) as illustrated in FIG. 2, and divides each reference region into a plurality of sub-regions (operation S330). For example, in FIG. 2 one image is divided into 5 reference regions, and each reference region is divided into 16 sub-regions, but the present inventive concept is not limited to division into only 5 reference regions and 16 sub-regions. Divisions into other numbers of reference regions and sub-regions are also contemplated.

After the division, the retrieving module 120 calculates the mean chroma of each reference region and the mean chroma of the sub-region (operation S340) constituting the concerned reference region for each reference region. After the calculation, the retrieving module 120 calculates the difference between the mean chroma of the reference region and the mean chromas of sub-regions (operation S350) constituting the concerned reference region for each reference region.

If there are one or more sub-regions in which the calculated difference is less than a threshold value, and the number of such regions occupies more than a certain number of the total number of sub-regions constituting the concerned reference region (operation S360), the retrieving module 120 can determine that a dominant object exists in the concerned reference region. The threshold value may be predetermined. A specific example is described by referring to FIG. 4.

Figure 4:
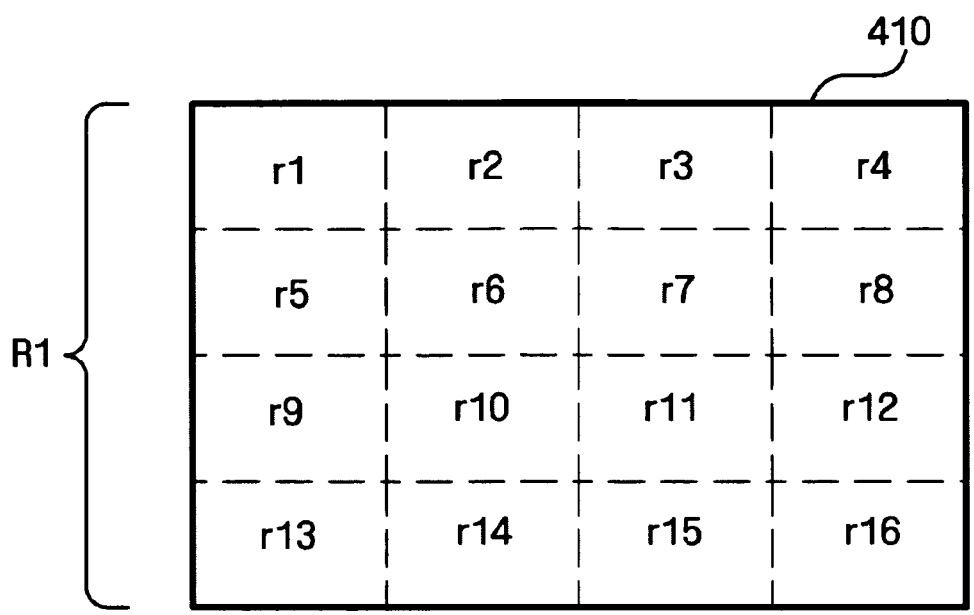
FIG. 4 illustrates a process of determining whether a dominant object exists according to an exemplary embodiment of the present invention.

FIG. 4 illustrates a certain reference region 410 of the image; and the illustrated reference region 410 consists of 16 sub-regions. The mean chroma of data included in the reference region 410 is labeled R1, and the mean chroma of data included in each of 16 sub-regions is labeled r1 to r16. The calculation of the mean chroma is executed in operation S340 of FIG. 3.

After the calculation, each of r1 to r16 is compared with R1 and the difference is calculated at operation S350. As a result of the calculation, if the number of sub-regions having the mean chroma whose difference with R1 is less than a threshold value, for example, a value of 8, the proportion of sub-regions that occupy reference region 410 is 50%. If the threshold rate mentioned in operation S360 is 40%, because the rate of sub-regions having the mean chroma whose difference with R1 (mean chroma of the reference region 410) is less than the threshold value among sub-regions of the reference region 410 is higher than the threshold rate, it can be confirmed that a dominant object exists in the reference region 410 by operations S360 and S370.

Further, if there is no reference region where there is a dominant object, the illuminant can be detected based on all data within the image as in the conventional art.

Figure 5:
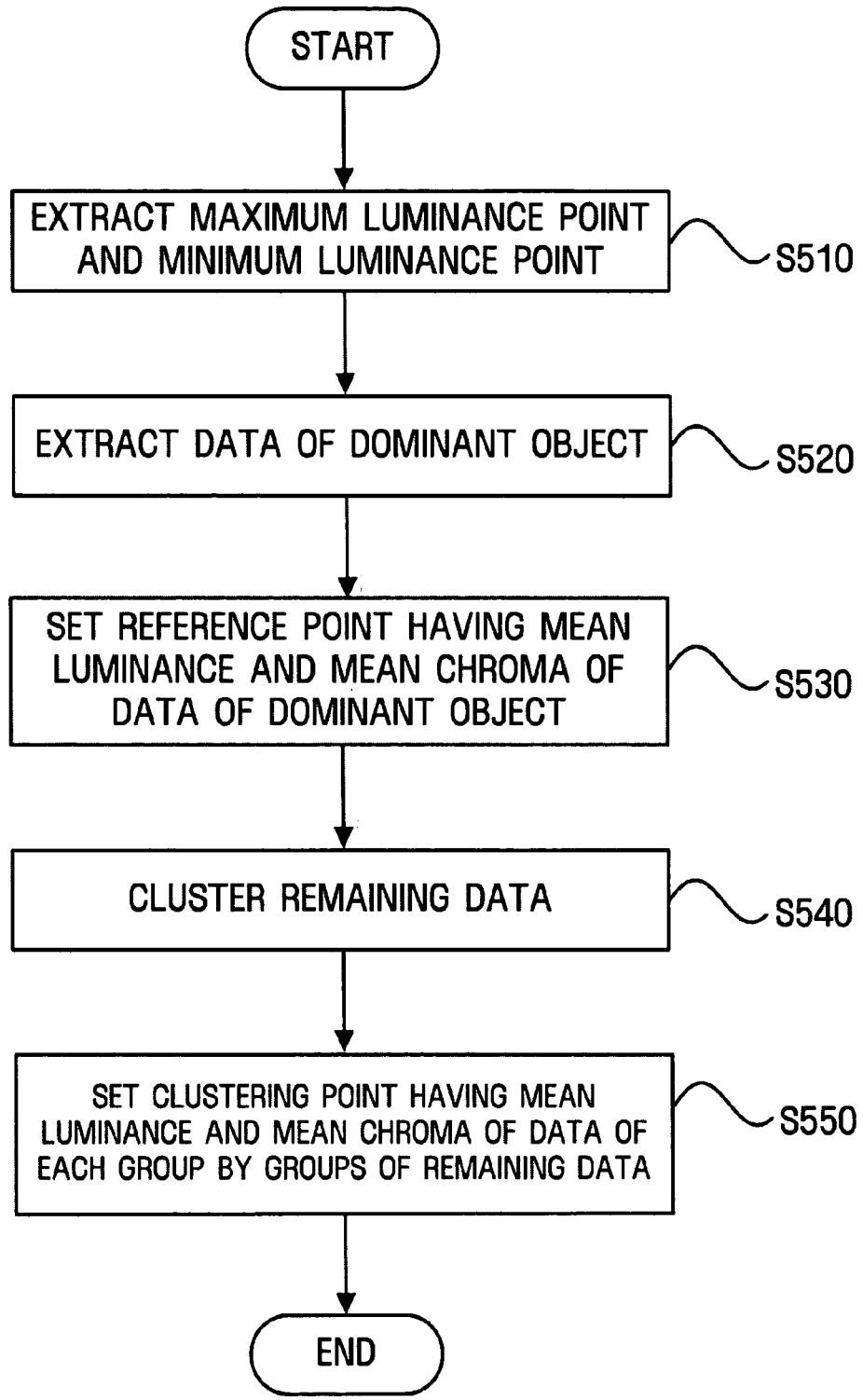
FIG. 5 is a flow chart illustrating a process of providing feature points of an inputted image.

FIG. 5 is a flow chart illustrating a process of providing feature points of an inputted image according to an exemplary embodiment of the present invention. The process of FIG. 5 can be executed by a feature-analyzing module 130 of the auto white controlling apparatus described by referring to FIG. 1 if it is determined that there is a dominant object on the image through the process of FIG. 3.

First, the feature-analyzing module 130 extracts a maximum luminance point and a minimum luminance point among data included in the image (operation S510). If data included in the image are distributed on the luminance-chroma space, the maximum luminance point and the minimum luminance point can be understood by an example illustrated in FIG. 6A.

After the extraction, the feature-analyzing module 130 extracts data corresponding to a dominant object among data included in the image (operation S520), and sets a reference point having the mean luminance and the mean chroma of the extracted data (operation S530).

Data corresponding to the dominant object can be detected through the chroma difference between the reference region and sub-regions. For example, the feature-analyzing module 130 calculates the mean chroma of the reference region and the mean chroma of each sub-region constituting the reference region. After the calculation, the feature-analyzing module 130 can compare the mean chroma of the reference region and the mean chroma of each sub-region, and determine data included in a sub-region, in which the difference is less than a threshold value as a result of the comparison, as data of a dominant object. Of course, the feature-analyzing module 130 can also use the result of the calculation that the retrieving module 120 executed in order to determine the inflow of the dominant object instead of directly calculating the mean chroma of the reference region and the mean chromas of sub-regions.

Figure 6A:
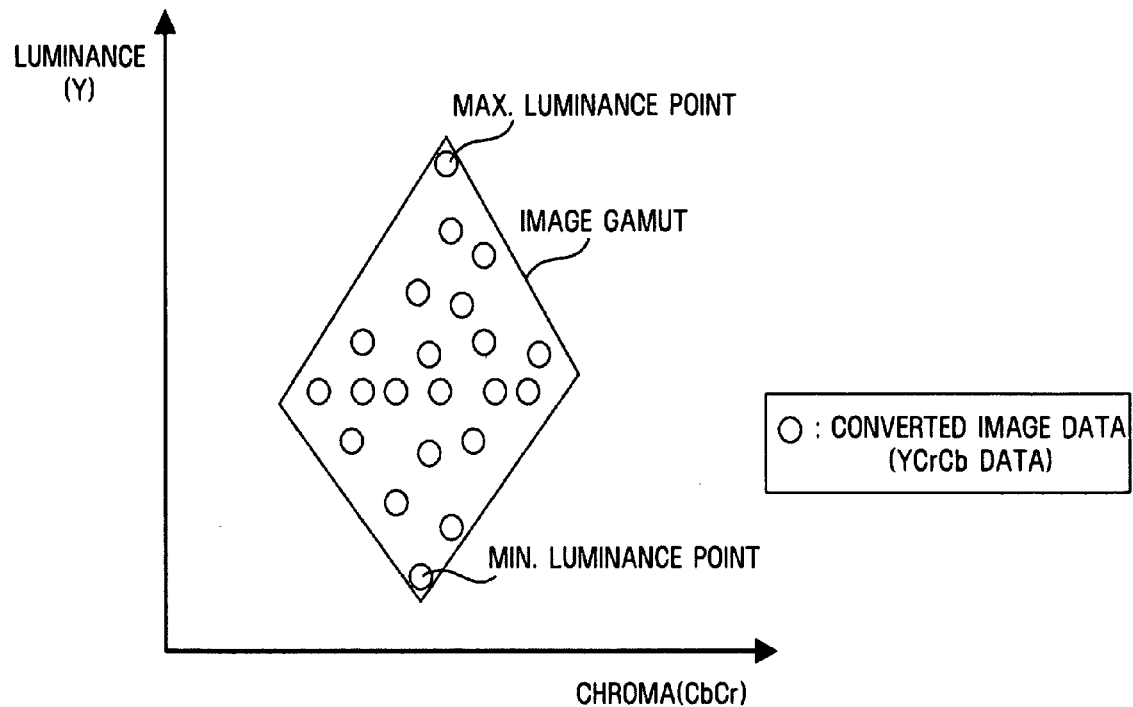
FIGS. 6A to 6C illustrate an example of image-data distribution on luminance-chroma coordinates.
Figure 6B:
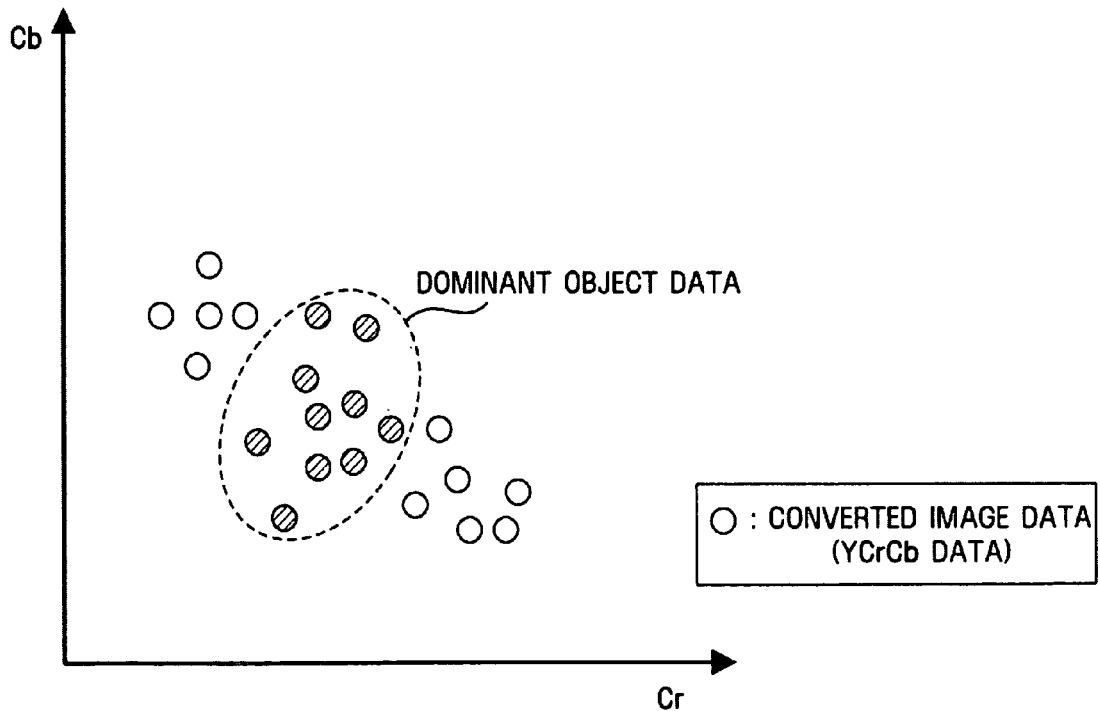
Figure 6C:
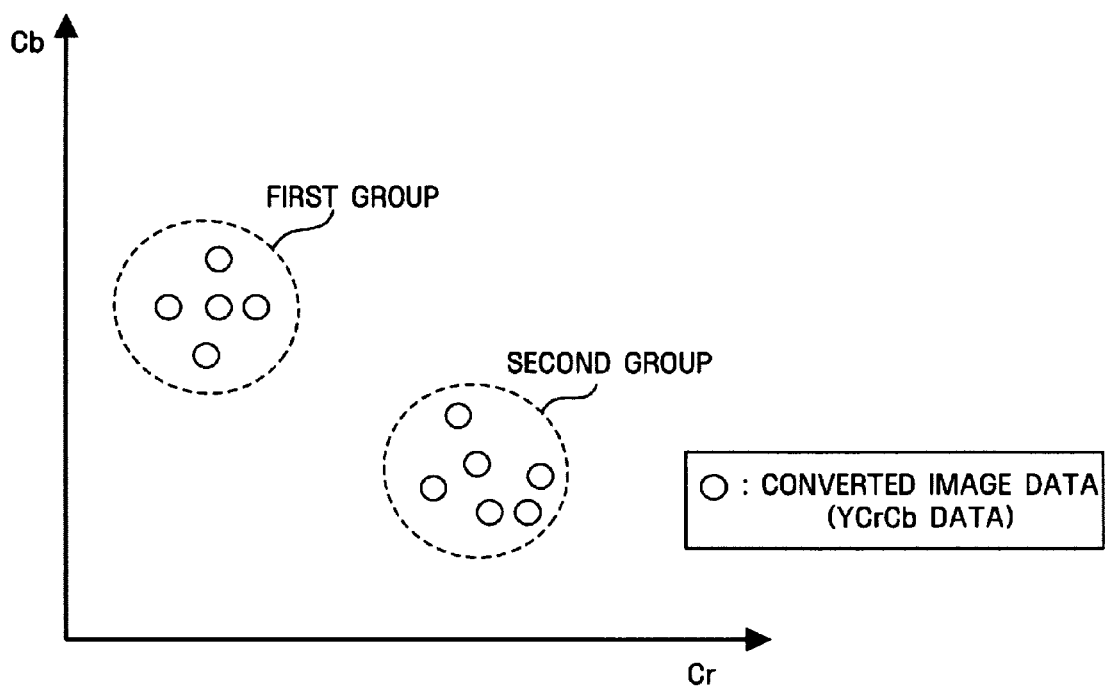

In the state where the distribution of the chroma coordinates of data constituting the image is like FIG. 6B, after data of the dominant object is extracted, remaining data is clustered into two groups by the feature-analyzing module 130 (operation S540) as illustrated in FIG. 6C. After the clustering, the feature-analyzing module 130 sets a clustering point having the mean luminance and the mean chroma of data by clustered groups (operation S550). In step S540, various forms of clustering techniques can be used in order to cluster remaining data. As an example, the feature-analyzing module 130 can cluster remaining data by using a simplified K-mean clustering technique.

Accordingly, the feature-analyzing module 130 provides 5 feature points: the maximum luminance point, the minimum luminance point, the reference point and two clustering points.

If the feature points are provided, the illuminant is detected by the illuminant-detecting module 140 as illustrated in FIG. 1. The detection is described by referring to FIG. 7.

Figure 7:
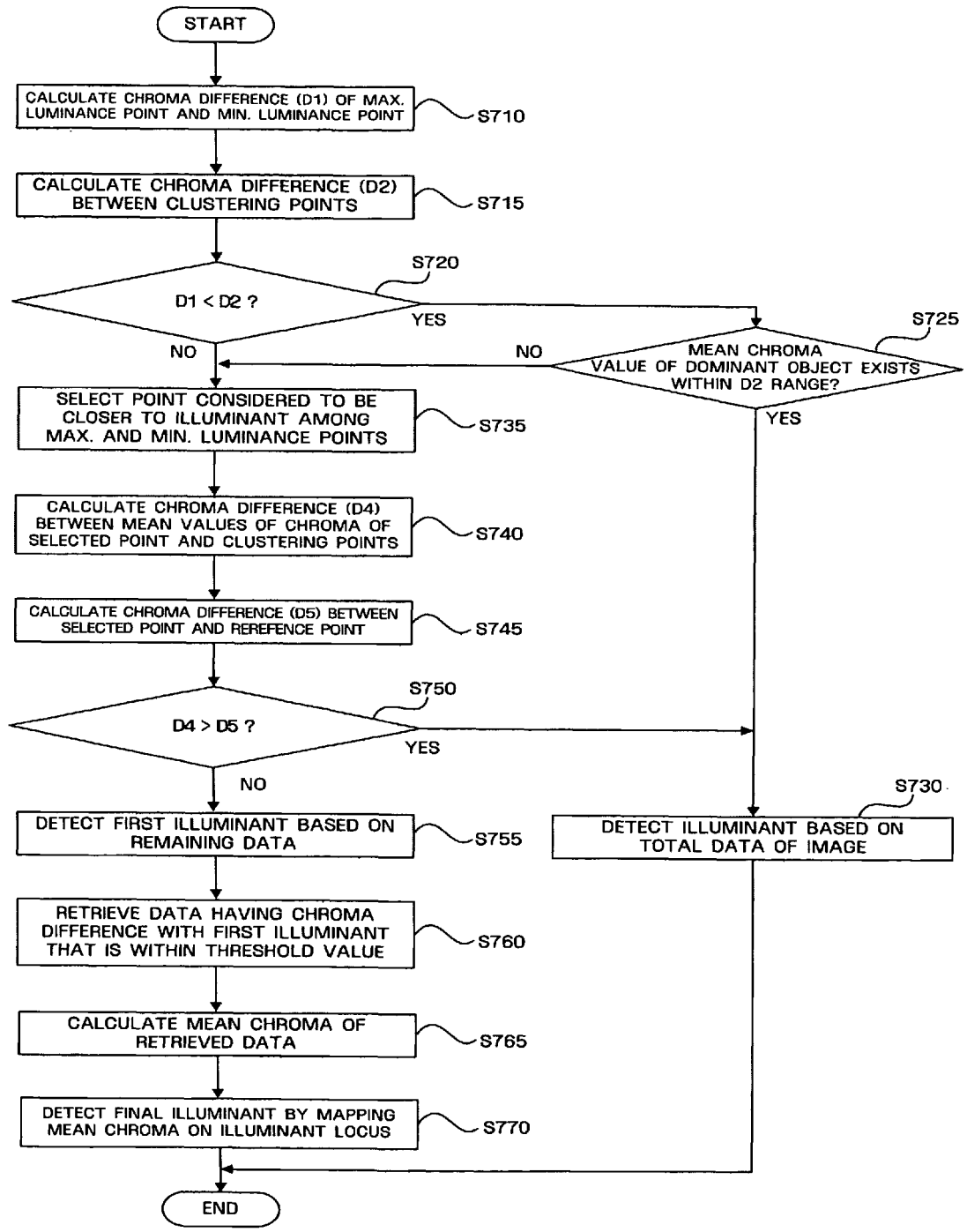
FIG. 7 is a flow chart illustrating a process of detecting an illuminant according to an exemplary embodiment of the present invention.

FIG. 7 is a flow chart illustrating a process of detecting illuminant according to an exemplary embodiment of the present invention. In the flow chart, the illuminant-detecting module 140 determines whether to include data of a dominant object as basic data for detecting the illuminant by distinguishing whether data of the dominant object is achromatic or chromatic.

First, the illuminant-detecting module 140 calculates a chroma difference (hereinafter, referred to as D1) between the maximum luminance point and the minimum luminance point (operation S710). For example, the illuminant-detecting module 140 reflects the maximum luminance point and the minimum luminance point in the chroma coordinates (Cr-Cb coordinates), and the distance between two data can be acquired. Here, the distance is D1.

In a similar way, the illuminant-detecting module 140 calculates a chroma difference (hereinafter, referred to as D2) between two clustering points (operation S715).

The smaller D1 becomes, the more information will be included between the chroma of the maximum luminance point and the chroma of the minimum luminance point, and the bigger D2 becomes, the bigger the degree of scattering becomes. Therefore, the illuminant-detecting module 140 can check the possibility that the color of the inputted image is changed by the influence of a dominant object by comparing D1 and D2.

Figure 8A:
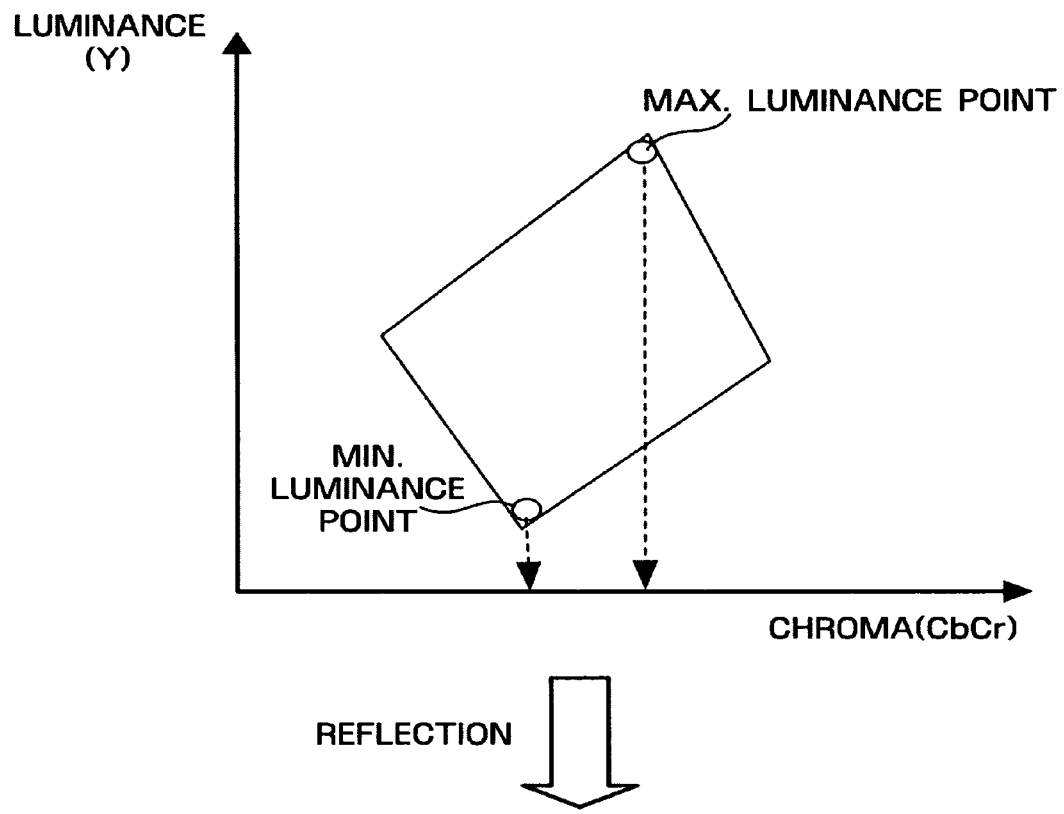
FIGS. 8A to 8G illustrate a process of detecting an illuminant.
Figure 8A:
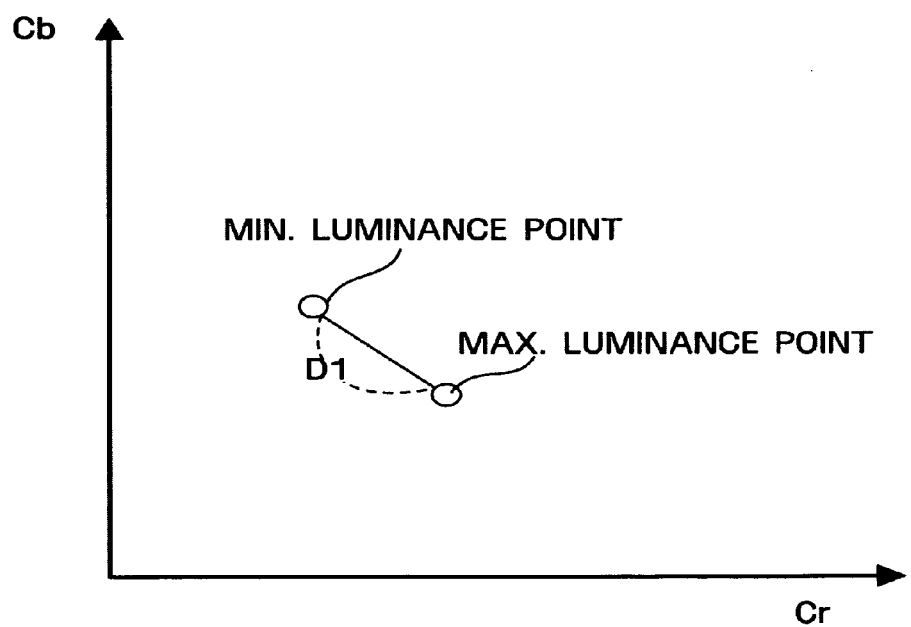
Figure 8B:
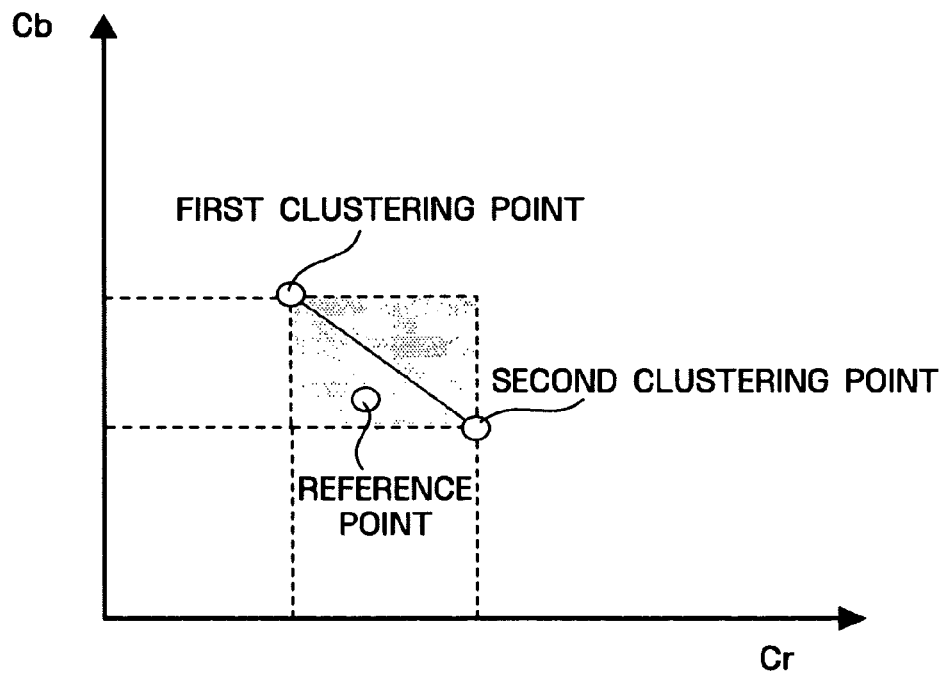

In more detail, first, the illuminant-detecting module 140 compares D1 and D2 (operation S720); if it is determined that D1 is smaller than D2, the illuminant-detecting module 140 determines whether a reference point indicating the mean chroma value of the dominant object is within the range of D2 on the chroma coordinates (operation S725). Here, the existence of the reference point within the range of D2 means that the reference point exists between the chroma value (Cr and Cb) of a first clustering point and the chroma value (Cr and Cb) of a second clustering point. For example, when the first clustering point and the second clustering point exist on the chroma coordinates as illustrated in FIG. 8B, if there is a reference point within a region (the shaded region) divided by using Cr and Cb values of the first clustering point and the second clustering point as a boundary, the reference point exists within the range of D2 on the chroma coordinates.

Figure 8C:
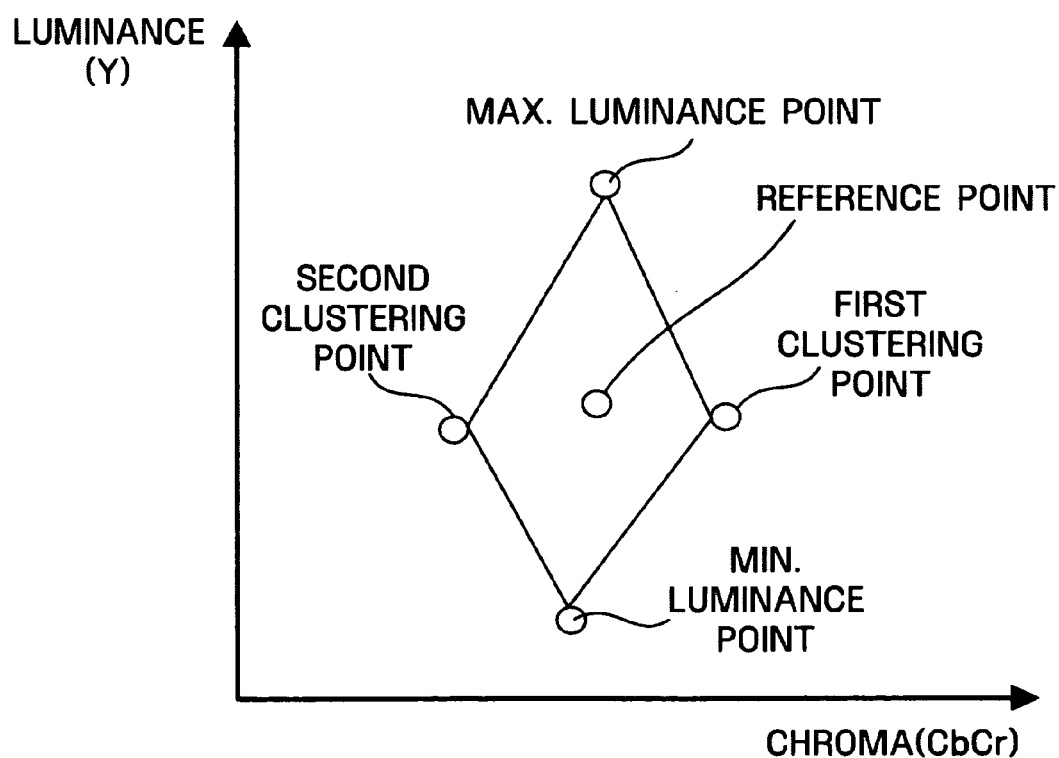

If it is determined that D1 is smaller than D2 and there is a reference point within the range of D2, the inputted image can be classified as a regular image that has not been affected by the dominant object. For reference, when an inputted image is a regular image, an example of an arrangement of the luminance-chroma coordinates of feature points provided by the feature-analyzing module 130 is illustrated in FIG. 8C.

If it is determined that D1 is smaller than D2, and the chroma mean value of the dominant object exists within the range of D2, the data of the dominant object is achromatic data, and the illuminant-detecting module 140 detects the illuminant, based on all data included in the image (operation S730). Here, a conventional illuminant-detecting technique can be used in order to detect the illuminant.

Figure 8D:
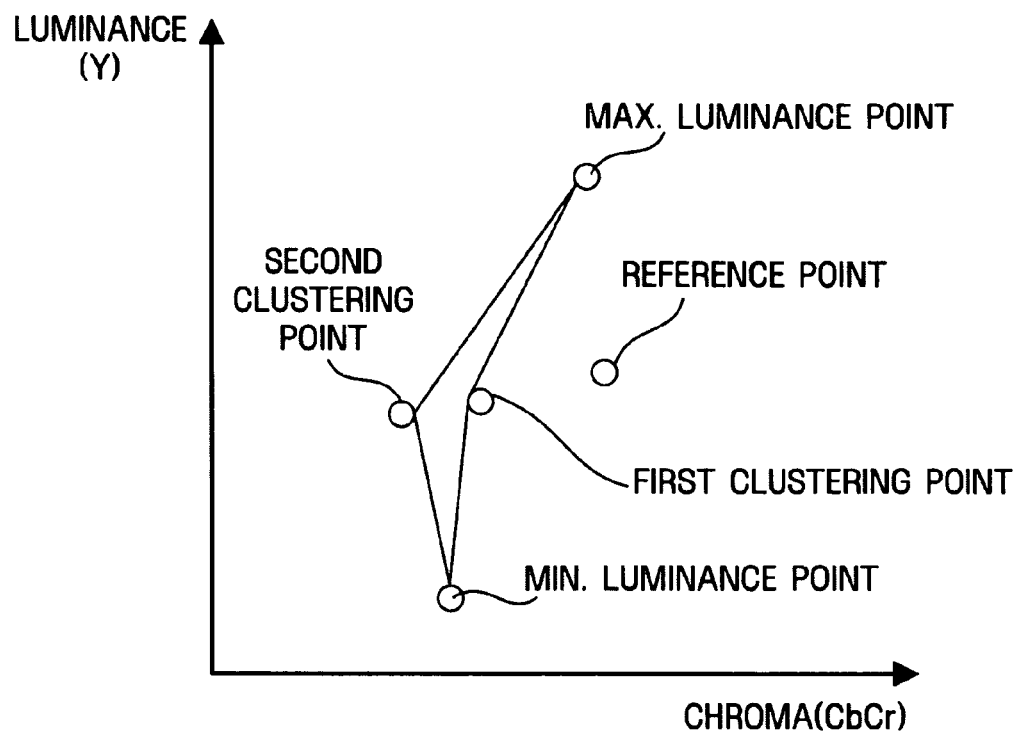

Further, if it is determined that D1 is not less than D2, or if it is determined that a reference point indicating the mean chroma value of the dominant object does not exist within the range of D2, the inputted image can be classified as an irregular image having a possibility that the color of the inputted image was changed by the influence of the dominant object. For example, if the inputted image is an irregular image, an example of the arrangement on the luminance-chroma coordinates of feature points provided by the feature-analyzing module 130 is illustrated in FIG. 8D. In other words, regardless of whether D1 is or is not less than D2, if a reference point indicating the mean chroma value of the dominant object does not exist within the range of D2, there is a possibility that data of the dominant object is chromatic data.

In order to distinguish whether data of the dominant object are chromatic data or achromatic data, first, the illuminant-detecting module 140 selects a point (hereinafter, referred to as a comparison point), among the maximum luminance point and the minimum luminance point, which is determined to be closer to the illuminant (operation S735). For the selection, the illuminant-detecting module 140 can compare the maximum luminance point and the minimum luminance point with data having the maximum luminance and data having the minimum luminance among data of the dominant object.

Figure 8E:
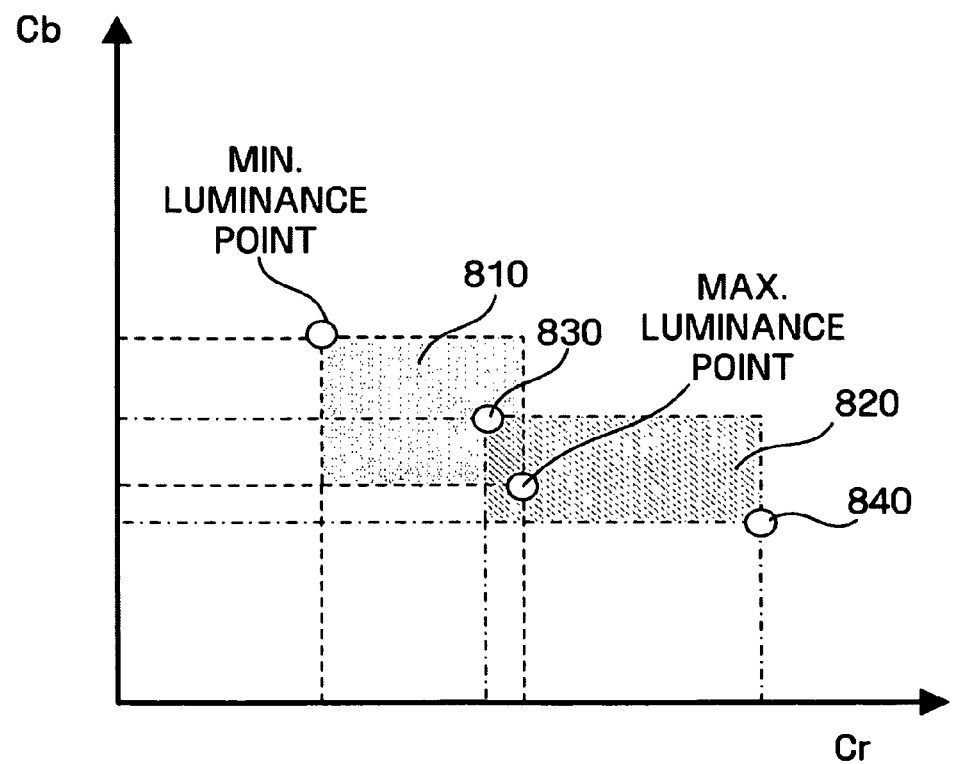

Specifically, the illuminant-detecting module 140 can select a comparison point by using whether a chroma difference (hereinafter, referred to as D3) of data having the maximum luminance and data having the minimum luminance among data of the dominant object and D1 are overlapped. Here, the overlapping of D1 and D3 denotes that the chroma region having the chroma value of the maximum luminance point and the chroma value of the minimum luminance point within the image as a boundary is overlapped with the chroma region having the chroma values of data having the maximum luminance and data having the minimum luminance in the dominant object as a boundary. For example, when the maximum luminance point, the minimum luminance point, and data having the maximum luminance and data having the minimum luminance in the dominant object exist on the chroma coordinates as illustrated in FIG. 8E, if the region 810, derived by using Cr and Cb values of the maximum luminance point and the minimum luminance point as a boundary, overlaps with the region 820 derived by using Cr and Cb values of data 830 having the maximum luminance and data 840 having the minimum luminance, D1 and D3 are considered overlapped.

Generally, considering a transition tendency of chroma data according to the change of luminance, if a chroma value of high luminance existing within the total image is transitioned to a chroma value of relatively higher luminance, or if a chroma value of low luminance existing within the total image is transitioned to a chroma value of relatively lower luminance, the chroma values have a tendency to become achromatic. Therefore, as D1 and D3 are overlapped on the chroma coordinates, if any one of the maximum luminance point and the minimum luminance point is included within the range of D3 (the chroma region 820 of FIG. 8E), the concerned point is determined as a comparison point close to the illuminant. In the case of FIG. 8E, because the maximum luminance point is included in the region 820, the point can be determined as a comparison point closest to the illuminant. Further, if D1 and D3 are overlapped, if any of the maximum luminance point and the minimum luminance point is not included in the range of D3, the minimum luminance data is determined to be a comparison point closest to the illuminant; if D1 and D3 are not overlapped, a point whose chroma distance from the range of D3 is further among the maximum luminance point and the minimum luminance point is determined to be a comparison point closest to the illuminant.

If a comparison point, which is determined to be closer to the illuminant among the maximum luminance point and the minimum luminance point, is selected, the illuminant-detecting module 140 calculates a luminance difference (hereinafter, referred to as D4) between the chroma of the selected comparison point and the mean value of chroma of clustering points (operation S740). Further, the illuminant-detecting module 140 calculates a chroma difference (hereinafter, referred to as D5) between the chroma of the selected comparison point and the mean chroma (the chroma of the reference point) of data constituting the dominant object (operation S745).

If it is determined that D4 is larger than D5 (operation S750), the illuminant-detecting module 140 determines data of the dominant object as achromatic data, and detects the illuminant, based on the all the data of the image (operation S730).

However, if it is determined that D4 is not larger than D5, the illuminant-detecting module determines data of the dominant object as chromatic data, and detects the first illuminant, based on remaining data except data of the dominant object (operation S755). The illuminant-detecting technique used for detecting a first illuminant in operation S755 may also be a conventional art technique. But, operation S755 is different from operation S730 in that remaining data, exempting data of the dominant object, are used for detecting the first illuminant.

Figure 8F:
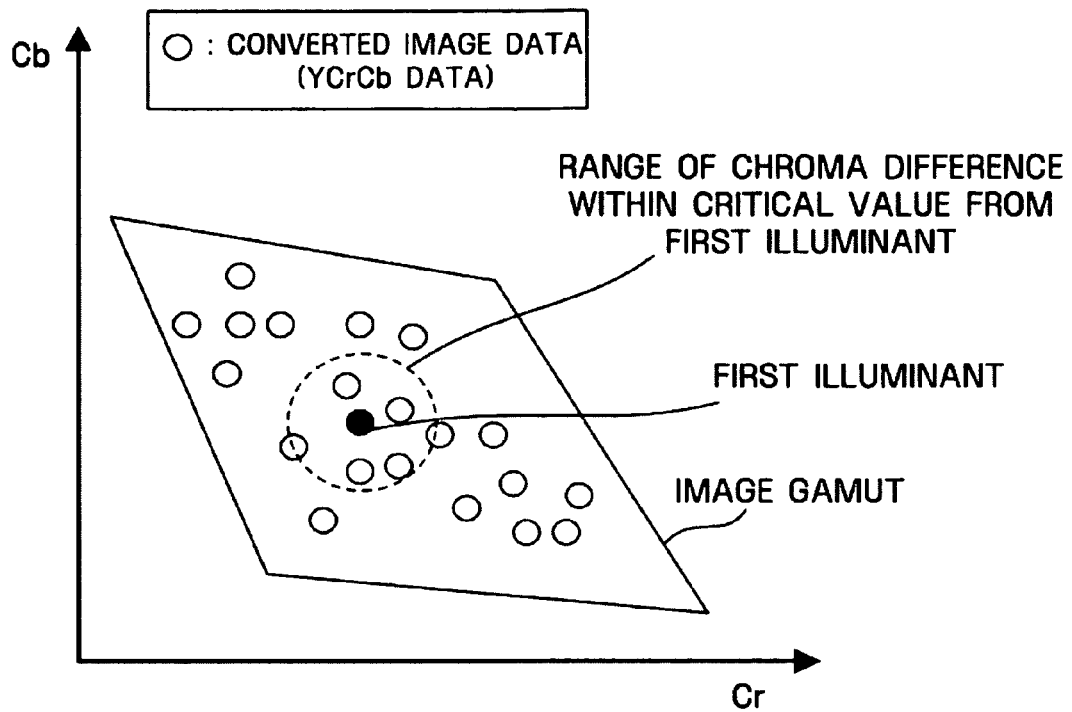

If the first illuminant is detected, the illuminant-detecting module 140 retrieves data having a chroma difference within the critical value from the first illuminant among data constituting the image (operation S760) as illustrated in FIG. 8F, and calculates the mean chroma of the retrieved data (operation S765).

Figure 8G:
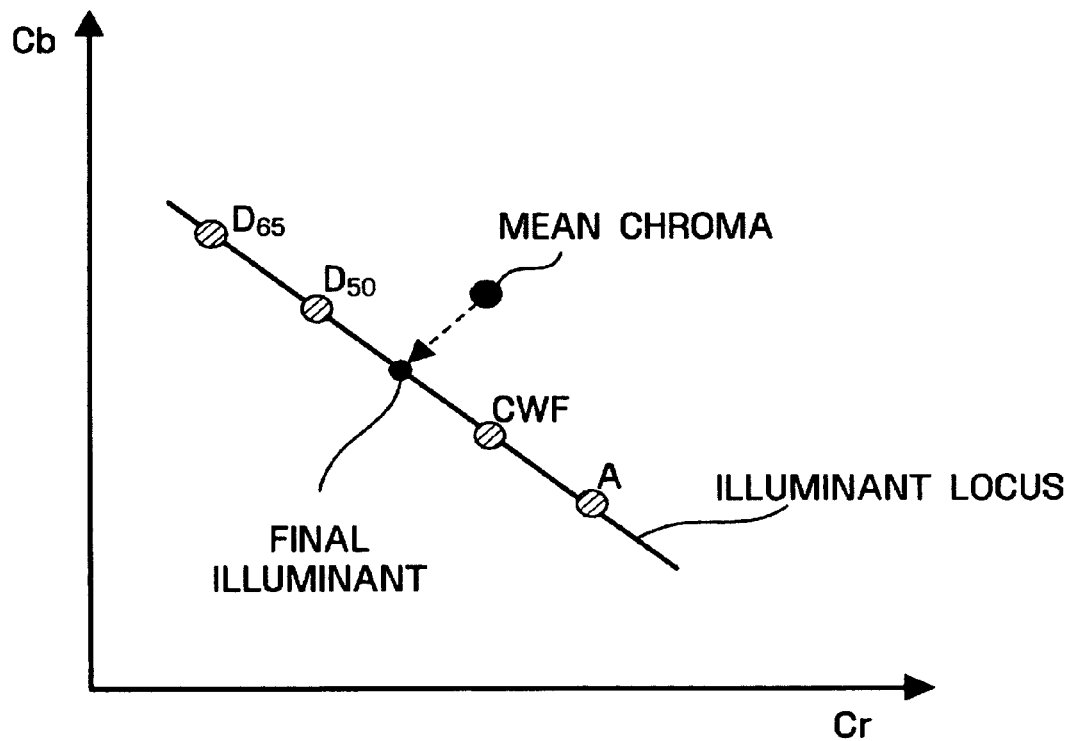

After the calculation, the illuminant-detecting module 140 detects the final illuminant by mapping the calculated mean chroma on the predetermined illuminant locus (operation S770). Here, the illuminant locus can be a trend line, based on chromas of a plurality of various forms of illuminants, e.g., D65, D50, CWF (Cool White Fluorescent), and A; the line is illustrated in FIG. 8G. FIG. 8G illustrates an illuminant locus on the chroma plane (Cr-Cb) and the mean chroma calculated in operation S765. The final illuminant has the chroma at the point where the mean chroma is vertically reflected on the illuminant locus.

Accordingly, the illuminant-detecting module 140 can prevent the deterioration of the illuminant by the influence of the dominant object.

If the final illuminant is detected through a series of processes described by referring to FIGS. 3 to 8G, the white balancing module 150 executes the white-balancing work on the inputted image by using the detected final illuminant.

It will be understood by those of ordinary skill in the art that various replacements, modifications and changes may be made in the form and details without departing from the spirit and scope of the present inventive concept as defined by the following claims. Therefore, it is should be appreciated that the above described exemplary embodiments are for purposes of illustration only and are not to be construed as limitations of the invention.

According to the auto white controlling method and apparatus of the present invention, consistent reproduction performance is provided even when an object having a dominant chroma exists in an image.

What is claimed is:

1. An auto white controlling method, comprising:
   dividing an image into a plurality of reference regions;
   dividing each of the plurality of reference regions into a plurality of sub-regions;
   for each of the reference regions, calculating a difference between a mean chroma of the reference region and a mean chroma of each of the sub-regions; and
   confirming that an object having dominant chroma is included in a reference region based on the calculated differences;
   providing a plurality of feature points having color features of the image if the image includes the object having the dominant chroma;
   detecting a first illuminant according to the plurality of feature points;
   calculating a mean chroma of data showing a chroma difference within a threshold value with a chroma of the first illuminant among data constituting the image; and
   providing a second illuminant by mapping the mean chroma to an illuminant locus.

2. The method of claim 1, wherein the object is confirmed as included within a reference region, where a number of sub-regions whose difference is less than a threshold value is greater than a threshold rate, among the plurality of reference regions.

3. The method of claim 1, wherein the providing of the feature points comprises:
extracting a maximum luminance point, data having a maximum luminance value, a minimum luminance point, and data having a minimum luminance value among data comprising the image;
providing a reference point having the mean luminance and the mean chroma of the data comprising the image; and
clustering remaining data except data comprising the object among data comprising the image into two groups, and providing a first clustering point and a second clustering point having the mean luminance and the mean chroma of remaining data included in each of the two groups.

4. The method of claim 3, further comprising:
confirming data included in sub-regions whose difference is less than the threshold value as data comprising the object.

5. The method of claim 3, wherein the providing of the first clustering point and the second clustering point comprises:
clustering the remaining data into the two groups by using a simplified K-mean clustering technique.

6. The method of claim 3, wherein the detecting of the first illuminant comprises:
selecting one of the maximum luminance point and the minimum luminance point as a comparison point if a first chroma difference between the maximum luminance point and the minimum luminance point is not less than a second chroma difference between the first clustering point and the second clustering point; and
detecting the first illuminant by using the remaining data, except for the data of the object, from data comprising the image if a third chroma difference between the mean value of the chroma of the first clustering point and the mean value of the chroma of the second clustering point is less than a fourth chroma difference between the chroma of the reference point and the chroma of the comparison point.

7. The method of claim 6, wherein the detecting of the first illuminant comprises:
selecting the comparison point if the first chroma difference is less than the second chroma difference, and the chroma of the reference point does not exist within the range of the second chroma difference.

8. The method of claim 6, wherein the selecting of the comparison point comprises:
selecting one of the maximum luminance point and the minimum luminance point included in the range of a fifth chroma difference as the comparison point if the first chroma difference is overlapped with the fifth chroma difference between data having the maximum luminance and data having the minimum luminance among data comprising the object.

9. The method of claim 6, wherein the selecting of the comparison point comprises:
selecting the minimum luminance point as the comparison point if the first chroma difference is overlapped with a fifth comparison difference between data having the maximum luminance and data having the minimum luminance among data comprising the object, and the maximum luminance point and the minimum luminance point are not included in the range of the fifth chroma difference.

10. The method of claim 6, wherein the selecting of the comparison point comprises:
selecting one of the maximum luminance point and the minimum luminance point which is closer to the range of a fifth chroma difference as the comparison point if the chroma difference is not overlapped with the fifth chroma difference between data having the maximum luminance and data having the minimum luminance among data comprising the object.

11. The method of claim 1, wherein the illuminant locus is a trend line using the chroma of a plurality of different illuminants.

12. The method of claim 1, further comprising:
white-balancing the image by using the second illuminant.

13. An auto white controlling apparatus, comprising:
a feature-analyzing module that provides a plurality of feature points having color features of an image if the image includes an object having dominant chroma;
an illuminant-detecting module that detects a first illuminant by using the plurality of feature points, calculates a mean chroma of data showing the color difference within a threshold value with the chroma of the first illuminant among data comprising the image, and provides a second illuminant by mapping the mean chroma to an illuminant locus; and
a retrieving module that divides the image into a plurality of reference regions, divides each of the plurality of reference regions into a plurality of sub-regions, calculates, for each of the reference regions, a difference between a mean chroma of the reference region and a mean chroma of each of the sub-regions, and confirms that an object is included in a reference region based on the calculated differences.

14. The apparatus of claim 13, wherein the object is confirmed as included within a reference region, where a number of sub-regions whose difference is less than a threshold value is greater than a threshold rate, among the plurality of reference regions.

15. The apparatus of claim 13, wherein the feature-analyzing module extracts a maximum luminance point, data having a maximum luminance value, a minimum luminance point, and data having a minimum luminance value among data comprising the image, provides a reference point having a mean luminance and a mean chroma of data comprising the image, and clusters remaining data, except for data comprising the object, among data comprising the image into two groups, and provides a first clustering point and a second clustering point having the mean luminance and the mean chroma of remaining data included in each of the two groups.

16. The apparatus of claim 15, further comprising:
a retrieving module that confirms data included in sub-regions whose difference is less than the threshold value as data comprising the object.

17. The apparatus of claim 15, wherein the feature-analyzing module clusters the remaining data into the two groups by using a simplified K-mean clustering technique.

18. The apparatus of claim 15, wherein the illuminant-detecting module selects one of the maximum luminance point and the minimum luminance point as a comparison point if a first chroma difference between the maximum luminance point and the minimum luminance point is not less than a second chroma difference between the first clustering point and the second clustering point, and detects the first illuminant by using remaining data except for data of the object from data comprising the image if a third chroma difference between the mean value of the chroma of the first clustering point and the chroma of the second clustering point is less than a fourth chroma difference between the chroma of the reference point and the chroma of the comparison point.

19. The apparatus of claim 18, wherein the illuminant-detecting module selects the comparison point if the first chroma difference is less than the second chroma difference, and the chroma of the reference point does not exist within the range of the second chroma difference.

20. The apparatus of claim 18, wherein the illuminant-detecting module selects one of the maximum luminance point and the minimum luminance point included in a range of a fifth chroma difference as the comparison point if the first chroma difference is overlapped with the fifth chroma difference between data having the maximum luminance and data having the minimum luminance among data comprising the object.

21. The apparatus of claim 18, wherein the illuminant-detecting module selects the minimum luminance point as the comparison point if the first chroma difference is overlapped with a fifth comparison difference between data having the maximum luminance and data having the minimum luminance among data comprising the object, and the maximum luminance point and the minimum luminance point are not included in the range of the fifth chroma difference.

22. The apparatus of claim 18, wherein the illuminant-detecting module selects one of the maximum luminance point and the minimum luminance point which is closer to the range of a fifth chroma difference as the comparison point if the chroma difference is not overlapped with the fifth chrom difference between data having the maximum luminance and data having the minimum luminance among data comprising the object.

23. The apparatus of claim 13, wherein the illuminant locus is a trend line using the chroma of a plurality of different illuminants.

24. The apparatus of claim 13, further comprising:
a white balancing module that white-balances the image by using the second illuminant.

* * * * *